United States Patent [19]

Coq

[11] Patent Number: 4,684,577

[45] Date of Patent: Aug. 4, 1987

[54] NON-STICK SILICONE BLEND COATING

[75] Inventor: Jean L. Coq, Benicarlo, Spain

[73] Assignee: E. I. Du Pont De Nemours and Company, Wilmington, Del.

[21] Appl. No.: 913,401

[22] Filed: Sep. 30, 1986

[51] Int. Cl.$^4$ ............................................. B32B 9/04
[52] U.S. Cl. .................................... 428/447; 428/450; 524/441; 524/500
[58] Field of Search ................ 524/441, 500; 428/450, 428/447

[56] References Cited

U.S. PATENT DOCUMENTS 4,374,754  2/1983  Aral ...................................... 428/450
4,477,517  10/1984  Rummel ............................... 428/450

Primary Examiner—Lewis T. Jacobs
Attorney, Agent, or Firm—Richard H. Burgess

[57] ABSTRACT

A blend of major amounts of a first silicon resin having relatively low proportions of silanol, phenyl and methyl groups with minor amounts of a second silicone resin having higher such proportions, preferably with aluminum flake, gives good adhesion to steel, aluminum and glass substrates and good non-stick performance for cooking foods. It can be used as a single-layer coating.

9 Claims, No Drawings

NON-STICK SILICONE BLEND COATING

BACKGROUND

This invention provides a blend of two different silicone resins precondensates. More particularly, it provides such a blend with aluminum flake for good adhesion to a substrate and good non-stick performance in cooking foods.

It is desirable to provide cookware with release or non-stick coatings so that food residues can be removed easily as the cookware is cleaned. High performance non-stick coatings generally include fluorocarbon resins such as polytetrafluoroethylene and require curing temperatures above 290° C. Silicone resin (or polysiloxane precondensate) coatings are less expensive and can be cured at lower temperatures but traditionally have characteristics which cause the coatings not to last as long as or perform as well as fluorocarbon resin coatings on cookware.

Prior attempts to provide silicone resin coatings, especially as single-layer coatings, have not given as high a level of performance as is desirable for certain cookware applications. Multilayer coatings are inherently more expensive to apply than single-layer coatings.

U.S. Pat. No. 4,369,279 (Jan. 18, 1983)—Emerick provides a single-coat silicone resin, epoxy coating composition containing a small amount of fluorocarbon polymer and curable at 107° C.

U.S. Pat. No. 4,181,686 (Jan. 1, 1980)—Vassiliou and its divisions U.S. Pat. Nos. 4,180,613 and 4,183,998 concern silicone resin coatings containing a relatively tough and sticky particulate organic modifier to provide improved craze resistance for thicker coatings.

U.S. Pat. No. 4,223,069 (Sept. 16, 1980)—Berghmans provides a three-coat system including an epoxy primer and different types of silicones having specified hydroxyl contents in the intermediate and topcoats.

U.S. Pat. No. 4,252,702 (Feb. 24, 1981)—Wald concerns a silicone- and epoxy-containing coating composition.

U.S. Pat. No. 4,477,517 (Oct. 16, 1984)—Rummel concerns a baking pan with a multilayer coating including a primer containing a silicone resin and a silicone oil and a topcoat containing a silicone resin, colloidal silica and flake pigment.

Each of these patents are incorporated by reference herein.

SUMMARY OF THE INVENTION

The present invention provides a coating composition consisting essentially of a blend of two silicone resin precondensates and aluminum flake containing 60 to 95% by weight based on silicone solids of a first silicone resin precondensate which has 3.5–4.0% by weight silicon-bonded hydroxyl content, a ratio of methyl groups to silicon atoms of 1.10 to 1.20, and a ratio of phenyl groups to silicon atoms of 0.4 to 0.5, 5 to 40% by weight based on silicone solids of a second silicone resin precondensate which has 4–6% by weight silicon-bonded hydroxyl content, a ratio of methyl groups to silicon atoms of 1.20 to 1.30, and a ratio of phenyl groups to silicon atoms of 0.6 to 0.7, 1 to 8% by weight based on total solids of aluminum flake, and liquid media, said coating composition being at a solids content of 40 to 55% by weight.

Such coating compositions can be used preferably as single-layer coatings on various substrates including steel, aluminum, plastic and glass. The steel can be tinplated or in other forms.

DETAILED DESCRIPTION

In coating compositions of the invention, the first silicone is especially useful in obtaining good adhesion to the substrate. The second silicone is more important for obtaining good non-stick or food release performance. If less than 5% by weight of the second silicone is used, non-stick performance is less than desirable. If less than 60% by weight of the first silicone (such as 50%) is used, both adhesion and non-stick performance are less than desired.

Although the individual silicone resin precondensates have been available in the past, they are here combined, using aluminum flake, in a novel manner to give superior results in terms of adherence to the substrate, non-stick, and hardness.

While 1% aluminum flake gives a much superior hardness compared to the use of none, 10% aluminum flake makes the film too brittle. Thus, 1 to 8% is a desirable range, and 2% is preferred.

Although it is known that variations in methyl/phenyl ratio and hydroxyl content can give one silicone better adhesion or non-stick performance than another, the use of the two types of silicones in accordance with the invention has not been known.

A weight ratio of the first and second silicone solids of 90:10 seems to give the best balance of properties. At 70:30 adhesion and hardness decreases, but the adhesion loss can be compensated for by grit- or sand-blasting a metal substrate before applying the coating. A ratio of 50:50 is too soft for general application.

Two silicones preferred for use in the present invention are available from Rhone Poulenc in 100% solids form. They are:

| Silicone | % silanol | Ratio Methyl/Si | Ratio Phenyl/Si |
|---|---|---|---|
| first (RP10367E) | 3.9 | 1.15 | 0.45 |
| second (RP6352E) | 4.6 | 1.24 | 0.62 |

Plastic substrates for microwave cookware of the invention preferably are of thermoset polyester resin (typically 20–30% by weight based on the total) which can be reinforced by fiberglass (8–13%). As is known, such compositions can include fillers such as calcium carbonate (45–65%), pigments to obtain desired colors (0.05–1.0%) and other adjuvants such as catalysts, inhibitors, thermoplastic resins, mold release agents, and other ingredients. Such thermoset polyester substrates can be used at temperatures up to about 232° C. Coating systems which can be applied and cured at peak temperatures in the range of 204 to 232° C. can be used on such substrates. Although coating compositions of the invention can be cured at higher temperatures such as 300° C., when used on such microwave plastics they should be cured for an appropriate longer time at temperatures below 232° C., such as 30 min. at 230° C.

In the following example and elsewhere herein, parts, proportions and percentages are by weight except where indicated otherwise.

EXAMPLE 1

Coating Preparation

Using the above-identified preferred silicones, solutions of each in toluene were prepared at a 60% solids level. Then the following ingredients were mixed together and sand ground to give a coating composition with a viscosity of 24 to 26 sec. in Ford cup 4 and a solids content of 48 to 50%. Solids levels up to 55% are obtainable.

| | |
|---|---|
| Xylene | 19.61 |
| solution of first silicon | 70.59 |
| solution of second silicon | 7.84 |
| aluminum flake pigment | 1.57 |
| carbon black pigment | 0.39 |

EXAMPLE 2

Coating Application

The coating composition of Example 1 was sprayed on a steel substrate, prebaked 10 minutes at 60° to 80° C., and cured 15 minutes at 300° C. By "single-layer" coating is meant a coating obtained with one prebake and curing step, however, many passes of the spray gun are used to build up the single layer. Short air-dry at ambient conditions may be done between sprayings; so long as the coating is not cured or baked at elevated temperatures between sprayings, it is considered to be a single layer. This is as distinguished from multi-layer coatings made by spraying, then baking or curing, then respraying.

Dry film thicknesses of 30-35 mm can be obtained in one set of sprayings; 60 mm thickness can be obtained by a second set of spraying before baking. Other application techniques than spraying can also be used, such as doctor blade, roller or squeegee coating.

These coatings gave good adhesion as measured by attempts to remove them by scratching with a finger nail after a short immersion in boiling water. Finger nail adhesion is improved when a metal substrate is grit blasted before coating.

EXAMPLE 3

Aluminum Level Testing

Coatings of Example 1 were made with different levels of aluminum flake and applied as in Example 2. Table 1 below shows the resulting hardness at 25° C. measured by the hardness of pencil lead needed to scratch the coating: HB is the softest, higher numbers in front of the H indicate higher hardnesses.

TABLE 1

| Al content % | Pencil Hardness |
|---|---|
| 0 | HB |
| 2 | 2H |
| 4 | 4H |
| 10 | 4H |
| 20 | 5H |

At levels of 10% or more, the coating is undesirably brittle.

EXAMPLE 4

Alternate Coating Preparation

The following ingredients were mixed and used to make and apply a coating composition as in Example 1 and 2:

| | |
|---|---|
| propylene glycol acetate (Proxitol-from Shell) | 24.73 |
| xylene | 7.34 |
| solution of first silicone | 39.95 |
| butyl glycol | 17.77 |
| silicone oil (DC 200 - dimethyl polysiloxane from Dow Corning) | 1.29 |
| Bentone rheology control mineral smectites treated with alkyl ammonium (from NL Chemicals) | 2.13 |
| Aluminum flake treated with stearic acid (from Silberline Co.) | 2 |
| Channel black - carbon black | 0.35 |

INDUSTRIAL APPLICABILITY

Coatings of this invention are particularly useful on steel industrial bakeware and on glass ovenware. They are also useful on aluminum cookware and plastic microwave cookware of various types. Preferably this substrate is in its final shape when the coating is applied, and there is no more forming of the substrate to be done after the coating is in place.

I claim:

1. A coating composition consisting essentially of a blend of two silicone resin precondensates and aluminum flake containing
   60 to 95% by weight based on silicon solids of a first silicone resin precondensate which has 3.5-4.0% by weight silicon-bonded hydroxyl content, a ratio of methyl groups to silicon atoms of 1.10 to 1.20, and a ratio of phenyl groups to silicon atoms of 0.4 to 0.5,
   5 to 40% by weight based on silicone solids of a second silicone resin precondensate which has 4-6% by weight silicon-bonded hydroxyl content, a ratio of methyl groups to silicon atoms of 1.20 to 1.30, and a ratio of phenyl groups to silicon atoms of 0.6 to 0.7,
   1 to 8% by weight based on total solids of aluminum flake, and
   liquid media,
   said coating composition being at a solids content of 40 to 55% by weight.

2. The coating composition of claim 1 containing about 90% of said first silicone, 10% of said second silicone, and 2% aluminum flake.

3. The coating composition of claim 2 wherein
   said first silicone has about 3.9% silicon-bonded hydroxyl content, a ratio of methyl groups to silicon atoms of about 1.15, and a ratio of phenyl groups to silicon atoms of about 0.45, and
   said second silicone has about 4-6% silicon-bonded hydroxyl content, a ratio of methyl groups to silicon atoms of about 1.24, and a ratio of phenyl groups to silicon atoms of about 0.62.

4. A steel substrate coated with a dried and cured single layer of coating composition of claim 1.

5. An aluminum substrate coated with a dried and cured single layer coating composition of claim 1.

6. A glass substrate coated with a dried and cured single layer coating composition of claim 1.

7. A plastic substrate coated with a dried and cured single layer coating composition of claim 1.

8. An article of cookware comprising a substrate of steel, aluminum, glass or plastic coated with a dried and cured single layer coating composition of claim 1.

9. An article of microwave cookware of claim 8 wherein the substrate is plastic.

* * * * *